Sept. 11, 1928.
C. J. ULRICH
1,683,850
JUICE EXTRACTOR
Original Filed March 5, 1925
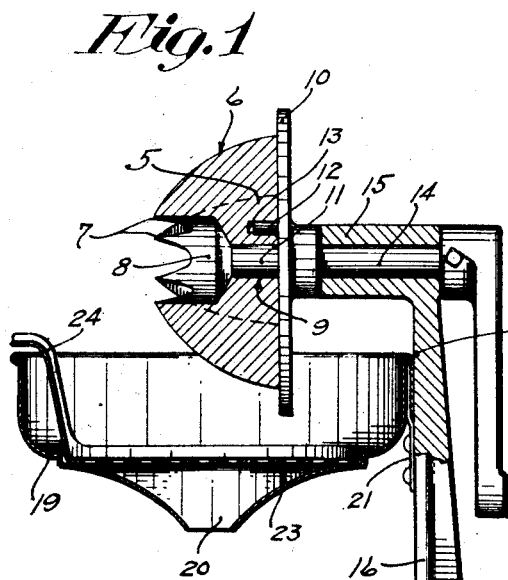
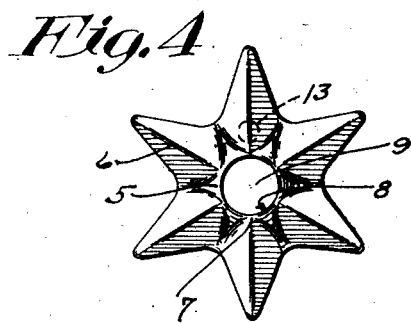
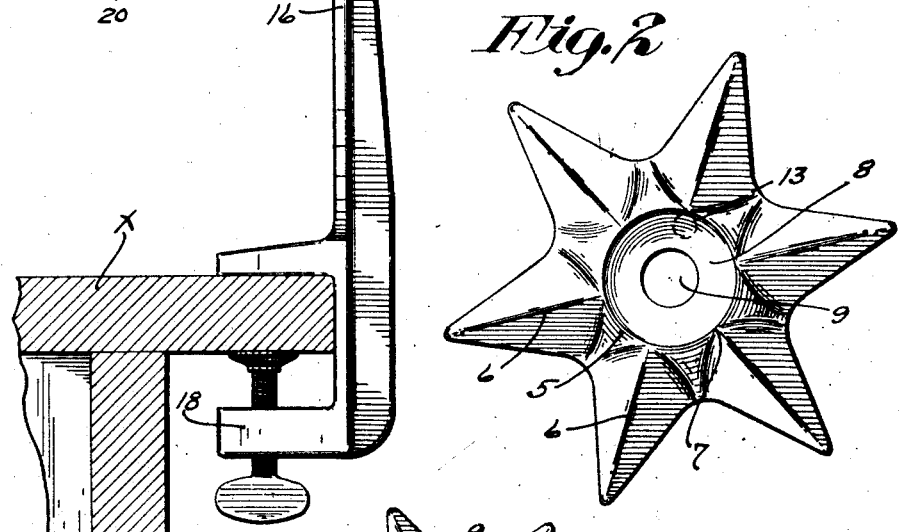
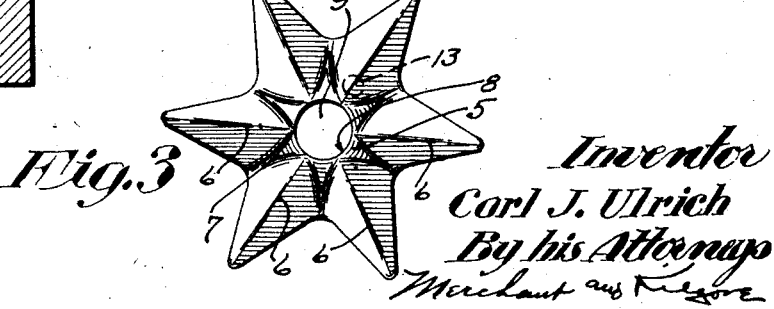
Inventor
Carl J. Ulrich
By his Attorneys Patented Sept. 11, 1928.

1,683,850

UNITED STATES PATENT OFFICE.

CARL J. ULRICH, OF MINNEAPOLIS, MINNESOTA.

JUICE EXTRACTOR.

Application filed March 5, 1925, Serial No. 13,360. Renewed July 16, 1927.

My present invention has for its object to provide an extremely simple and highly efficient device for extracting the juice from citrous fruit, such as lemons, oranges, grapefruit and the like, and to this end consists of the novel devices and combinations of devices hereinafter described and defined in the claim.

In the accompanying drawings, which illustrate the invention, like characters indicate like parts throughout the several views.

Referring to the drawings:

Fig. 1 is a view partly in side elevation and partly in central vertical section showing the juice extracting device clamped to a fragment of a table top;

Fig. 2 is a face view of the reamer shown in Fig. 1; and

Figs. 3 and 4 are face views of reamers of different sizes.

The numeral 5 indicates a substantially conical reamer which, at the edges of its blades 6, is substantially semi-spherical. The reamer blades 6 are extended forward of the apex of the body of the reamer 5 to relatively sharp points 7 which are circumferentially and radially spaced in respect to the axis of said reamer. Formed in the body of the reamer 5 at the apex thereof, inward of the radially spaced blade points 7, is a cylindrical recess or cavity 8 axially aligned with the reamer 5. A trunnion seat 9 extends completely through the body of the reamer 5 from its back to the bottom of the recess 8 and is in the form of an axially located bore.

It may be here stated that the large reamer 5 shown in Fig. 2 is designed for use in extracting juice from citrous fruit, such as a grapefruit. The intermediate sized reamer shown in Fig. 3 is designed for extracting juice from citrous fruit, such as oranges; and the small reamer shown in Fig. 4 for small citrous fruit, such as lemons. The reamer shown in Fig. 1 is the same reamer as that shown in Fig. 2 only on a smaller scale, and it will be noted that its recess 8 has a diameter considerably larger than its trunnion seat 9. The recesses 8 in the reamers shown in Figs. 3 and 4, as shown, are of the same diameters as the trunnion seats 9.

At the base of the reamer 5 is a closed disc-like face 10 having a diameter considerably greater than the base of the reamer 5 which bears thereagainst. Said face plate 10 is provided with an axially projecting trunnion 11 which extends loosely into the trunnion seat 9 and terminates at the bottom of the recess 8. An eccentrically located dowel pin 12 on the face plate 10 extends into a bore 13 in the base of the reamer 5 and holds said reamer from turning on the trunnion 11. Obviously, the reamer 5 may be applied or removed from the face plate 10 by an axial movement in respect thereto. Various other means, of course, may be provided for holding the reamer 5 from turning in respect to the face plate 10.

Projecting rearward from the back of the face plate 10 in axial alignment with the trunnion 11, is a shaft 14 which supports the reamer 5 for rotation around a horizontal axis. This shaft 14 is journaled in a relatively long bearing 15 formed with the upper end of a standard 16 and projects laterally therefrom. On the rear end of the shaft 14 is secured a removable hand crank 17 by which the reamer 5 may be rotated. Formed with the lower end of the standard 16 is a clamp 18 for securing the device to a table top X or other suitable support.

For collecting juice removed from citrous fruit by the reamer 5 and directing the same into a tumbler or other receptacle, not shown, there is located directly under said reamer 5 a pan-like receptacle 19 having a funnel-like bottom 20. This receptacle 19 is detachably secured to the standard 16 by an upstanding prong 21 on said standard and arranged to enter a slot-like seat 22 on said receptacle. The receptacle 19 can be detached from the standard 16 by a lifting movement to withdraw the prong 21 from its seat 22.

For removing the seeds and pulp from the juice extracted from the citrous fruit, there is removably held in the bottom of the receptacle 19, a strainer 23 having a hand piece 24 by which it can be lifted from said receptacle.

As far as the operation of the reamer 5 is concerned, the same may be mounted in either a vertical or horizontal position and either held stationary or mounted for rotation. In case the reamer 5 is held stationary, it will be necessary to turn and press citrous fruit thereagainst to extract its juice, but when the reamer 5 is rotated, either by hand or power, the citrous fruit would be held from turning and only pressed against the reamer.

To extract the juice from a citrous fruit by means of the device shown, the same is first cut in half and the halves thereof pressed, one at a time, against the reamer 5 at the apex thereof, while the same is rotated by the hand crank 17. As the citrous fruit is fed to the reamer 5, the rotating blades 6 thereof press the juice therefrom. The face plate 10 not only affords a stop for the rind of a half of a citrous fruit as it is pressed out of the reamer 5, but it directs the juice extracted therefrom into the receptacle 19.

The forwardly projecting ends or points 7 of the blades 6 and the cavity 8 in the reamer 5 perform the following important functions: In pressing the cut surface of a citrous fruit onto the reamer 5, the points 7 will enter said surface at circumferentially spaced points outward of the core of the fruit and thereby center the recess 8 to receive said core and also position the longitudinal edges of the blades parallel to the inside of the rind. Under the rotation of the reamer 5, the blade points 7 break or tear the webs radiating from the core of the fruit to the rind thereof, and at the same time break up the pulp with the assistance of the blades 6 and thereby greatly facilitate the extraction of the fruit juice. By providing the reamer 5 with the recess 8 the core of a citrous fruit will be held therein so that the edges of the blades 6, which extend parallel to the inner surface of the rind, will press the pulp against the inside of the rind throughout their entire length, and thereby extract all of the juice from the fruit. If it was not for the recess 8, the apex of the reamer 5 would engage the core of the fruit and thereby be thrown off center; and furthermore this core would act as a stop, when pressed against the inside of the rind by the reamer 5, and thereby hold portions of the blades 6 out of engagement with the inside of the rind and thereby would not extract all of the juice.

As the face plate 10, as previously stated, is closed, or in other words imperforated, not any of the juice will work into the bearing 15. The construction and arrangement of the several parts of the device are such that they may be very easily separated and cleansed and then reassembled.

The above described invention has, in actual commercial usage, proven highly efficient for the purpose had in view.

What I claim is:

A conical reamer for extracting juices from citrous fruit and having an axial trunnion seat extending completely therethrough, said reamer having at its base a separate face plate provided with a trunnion extending into said trunnion seat, said reamer being held against rotation in respect to the face plate.

In testimony whereof I affix my signature.

CARL J. ULRICH.